May 6, 1941.  F. HENSCHEL  2,240,649
DRIVING DEVICE FOR MILLS
Filed Oct. 12, 1938
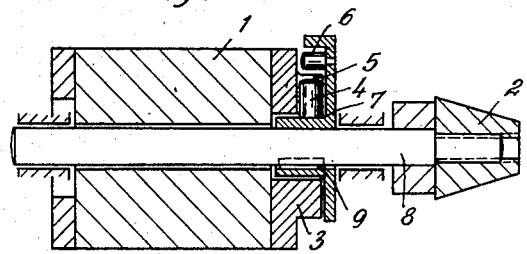
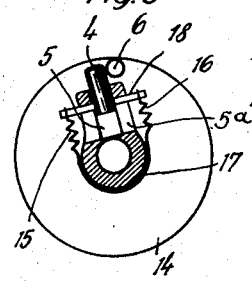
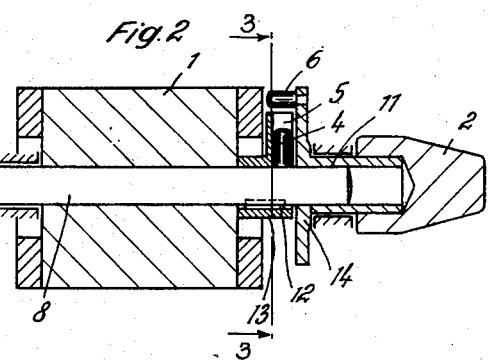
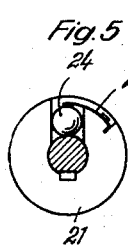
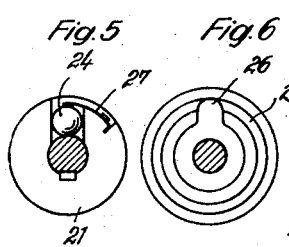
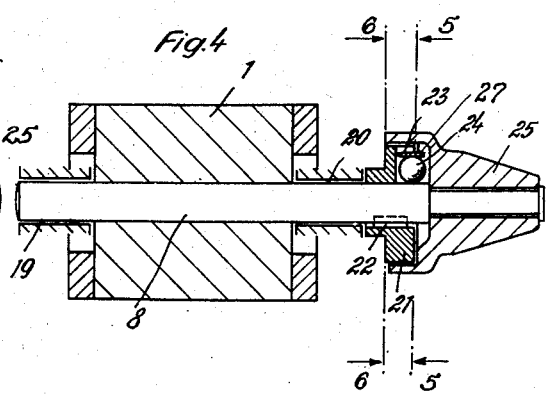
Inventor
Friedrich Henschel
by Knight Bros
attorneys Patented May 6, 1941

2,240,649

UNITED STATES PATENT OFFICE 2,240,649

DRIVING DEVICE FOR MILLS

Friedrich Henschel, Berlin, Germany, assignor to Patentverwertungs-Gesellschaft mit beschrankter Haftung "Hermes," Berlin, Germany, a corporation of Germany Application October 12, 1938, Serial No. 234,732
In Germany September 15, 1937

4 Claims. (Cl. 83—18)

This invention relates to a driving device for domestic appliances, particularly to a fractional H. P. motor for coffee grinders.

It has already been proposed to provide in driving devices for domestic appliances a coupling between the driving part and the driven part. The known driving devices of this type have, however, the disadvantage that they do not meet all occurring conditions. The fractional H. P. motor for domestic grinders must, for instance, meet at times a condition in which its power is not sufficient to grind the material. This is particularly the case in domestic appliances if occasionally abnormally hard bodies are in the material to be ground. In this case the driving device of the known domestic appliances fails to operate so that a cleaning of the same is required, which is cumbersome and time absorbing. The hard material which cannot be ground must then be taken out of the apparatus, if necessary, crushed by hand and then placed again in the apparatus.

According to the present invention these drawbacks inherent in the driving devices for domestic appliances are removed by so arranging a centrifugal weight in the coupling that it comes into engagement with a stop under the action of the centrifugal force so that the motor drives the appliance by jerks owing to its kinetic energy. The centrifugal weight is preferably under the action of a spring by means of which it returns to its position of rest below a given motor speed. This spring may be so designed as to be adjustable in order that it may be adapted to the requirements of operation and to the nature of the material to be ground. The centrifugal weight may either be arranged directly on the rotor of the motor and may come into engagement with a stop secured to the driven shaft or it may be arranged in a housing fixed on the motor shaft and come into engagement with a stop secured to the driven element. A cylindrical or spherical body so arranged as to move radially in a guide serves preferably as a centrifugal weight. Inert masses may be allotted to the driving part as flywheel masses. In this manner the jerk to be exerted upon the part to be driven will become stronger.

In the accompanying drawing are shown some embodiments of driving devices for coffee grinders.

Fig. 1 shows a longitudinal sectional view of a driving device according to the invention.

Fig. 2 shows another embodiment of the invention in similar view.

Fig. 3 shows a transverse section of Fig. 2 on the line 3—3 in Fig. 2.

Fig. 4 shows a longitudinal sectional view of another embodiment of the invention in which a ball serves as a centrifugal weight.

Fig. 5 shows an end view of housing 21 seen from the right-hand side Fig. 4, and Fig. 6 shows an end view of cone 25 seen from the left-hand side Fig. 4.

In the embodiment according to Fig. 1 the driving part of the device consists of the rotor 1 to the end of which facing the grinding cone 2 of a coffee grinder is secured the housing 3 for the centrifugal weight 4. Housing 3 together with rotor 1 is disposed to rotate on a sleeve of driven plate 7 keyed at 9 to driven shaft 8. The centrifugal weight 4 moves in a radial guide slot 5 arranged in housing 3. Upon the rotation of the rotor 1 the centrifugal weight 4 comes into engagement with the driven pin 6 arranged in its path on the driven plate 7. The grinding cone 2 is fixed on the shaft 8.

In the embodiment shown in Fig. 2 the rotor 1 is firmly secured to the shaft 8 rotatably mounted as indicated at 10 and 11. The weight housing 13 is also secured to the shaft 8 by means of the key 12. The centrifugal weight 4 disposed within housing 13 moves also in this case in a radially arranged guide 5. The pin 6 extending into the path of the guide 5 is secured to the driven plate 14 rigidly connected with the grinding cone 2.

Fig. 3 shows a transverse section of the housing for the centrifugal weight. 5 denotes the guide for the centrifugal weight 4 which is provided with a slot 5a for the reception of the cross pin 18 controlled by a strap 17 having resilient portions 15 and 16. The springs 15 and 16 upon a decrease in the speed pull the centrifugal weight 4 within the guide 5 towards the shaft 8. In the position shown the centrifugal weight 4 is shown expelled and in engagement with the pin 6 of the driven plate 14.

Also in the embodiment shown in Fig. 4 the rotor 1 is firmly secured to the shaft 8 rotatably mounted as indicated at 19 and 20 and rigidly connected with the housing 21 by means of the key 22. Housing 21 is provided with a radial slot 23 for the reception of the ball 24 serving as a centrifugal weight. Upon the rotation of the rotor 1 the ball 24 is moved away from the shaft and enters partly the recess 26 arranged in the grinding cone 25 (Fig. 6), while the remainder of the ball still remains in radial slot 23, thus coupling the grinding cone with the housing. As will be seen from Fig. 5 the ball 24 serving as a centrifugal weight is also under the action of a spring opposing the centrifugal force, for instance, of a blade spring 27. Thus the centrifugal weight is forced back in the direction towards the shaft of the driving part by spring 27 when the driving device is at rest or upon a decrease in the centrifugal force, thus releasing the coupling with the grinding cone.

The novel driving device presents the advantage that the rotor of the small motor which is designed preferably as a squirrel cage rotor at first starts on no load because it is uncoupled from the utility device. The suddenness at which the centrifugal force is exerted depends upon the mass acceleration of the rotor and if desired this mass may be increased by the addition of inert masses. This exertion of the centrifugal force at a given desired speed causes a sudden coupling between the driving and the driven elements and thus a jerk is exerted by the momentum of the driving element, so that in the case of domestic appliances, particularly of grinders, sufficiently strong forces are available especially for starting the grinding of the material or for overcoming the resistance of hard particles during grinding. The novel driving device renders it possible to design the motor smaller than has hitherto been the case, which is of great importance in the case of domestic appliances owing to the saving in space thus attained.

What is claimed is:

1. Coupling for motor driven grinders or the like, comprising a housing arranged to rotate with the rotor of the motor and having a radially disposed guide way, a centrifugal weight slidingly disposed in said guide way, a disc fixed on the driven portion of the grinder and disposed to laterally close said guide way, a coupling pin fixed on said disc near the outer end of said guide way and in the path of said weight, whereby the latter, when moving outwardly due to the centrifugal force, encounters said element and couples the grinder with the rotor with a sudden impact after a number of rotor revolutions depending upon the acceleration speed of the rotor.

2. Coupling for motor driven grinders or the like, comprising a housing arranged to rotate with the rotor of the motor and having a radially disposed guide way, a centrifugal weight slidingly disposed in said guide way, a coupling pin fixed on the driven portion of the grinder and disposed at the outer end of said guide way in the path of said weight, whereby the latter, when moving outwardly due to the centrifugal force, encounters said pin and couples the grinder with the rotor with a sudden impact after a number of rotor revolutions depending upon the acceleration speed of the rotor.

3. In combination with a grinding cone of a motor-driven grinder or the like, a coupling comprising a housing arranged to rotate with the rotor of the motor and having a radially disposed guide way, a centrifugal weight slidingly disposed in said guide way, a coupling element rigidly connected with said grinding cone and disposed at the outer end of said guide way in the path of said weight, whereby the latter, when moving outwardly due to the centrifugal force, encounters said element and rigidly couples the grinder with the rotor with a sudden impact.

4. In combination with a grinding member of a motor-driven grinding device or the like, a coupling element firmly connected with the motor of said device having a radially disposed guide way, a second coupling element firmly connected with said grinding member so as to be non-rotatable relatively to said grinding member, said second coupling element having a coupling surface disposed near the peripheral end of said guide way so as to be engaged by said weight with a sudden impact when said weight moves outwardly due to the centrifugal force.

FRIEDRICH HENSCHEL.